United States Patent [11] 3,571,564

| [72] | Inventor | Stanley B. Welch |
| | | Louisville, Ky. |
| [21] | Appl. No. | 779,869 |
| [22] | Filed | Nov. 29, 1968 |
| [45] | Patented | Mar. 23, 1971 |
| [73] | Assignee | General Electric Company |

[54] MULTILEVEL TEMPERATURE CONTROL CIRCUIT
6 Claims, 3 Drawing Figs.

| [52] | U.S. Cl. | 219/501 |
| [51] | Int. Cl. | H05b 1/02 |
| [50] | Field of Search | 219/494, 504, 505; 219/501 |

[56] References Cited
UNITED STATES PATENTS
3,428,785  2/1969  Welch .......................... 219/501

*Primary Examiner*—Bernard A. Gilheany
*Assistant Examiner*—F. E. Bell
*Attorneys*—Richard L. Caslin, Harry M. Manbeck, Jr., Frank L. Neuhauser and Oscar B. Waddell ABSTRACT: A solid-state circuit for maintaining the temperature of an oven at a first or second selected level. A voltage divider supplies a temperature-dependent voltage to a threshold switching device such as a silicon controlled switch. When the oven temperature is below a first set point, the SCS is turned on and gates an SCR connected in series with a hot wire relay. The hot wire relay biases a pair of contacts closed to energize the oven heating element. When oven temperature rises above the set point, the voltage applied to the SCS decreases below the threshold voltage. The SCR is no longer gated, and the hot wire relay cools so that the relay contacts open. A single switch is employed to connect a differing resistance into the voltage divider to change the control circuit set point. In addition, the hot wire relay may be included in the voltage divider and act as a thermistor upon being energized and deenergized. In this manner, fluctuation of the voltage applied to the SCS at the threshold level is prevented and rapid cycling of the relay cannot occur.

PATENTED MAR 23 1971 3,571,564

INVENTOR.
STANLEY B. WELCH
BY Richard L. Cash
HIS ATTORNEY

MULTILEVEL TEMPERATURE CONTROL CIRCUIT

BACKGROUND OF THE INVENTION

This invention relates to control circuits. More specifically, it relates to a solid state temperature control circuit for a heating unit such as an oven.

In recent years, solid-state control circuits have come into use to regulate the temperature in domestic electric ovens. A general form for such a circuit is illustrated in U.S. Pat. No. 3,277,280 to P.R. Staples and D.S. Heidtmann, assigned to the General Electric Company. More specialized solid-state temperature control circuits are disclosed in patent applications, Ser. No. 561,824, filed Jun. 30, 1966 and Ser. No. 553,207, filed May 26, 1966 now U.S. Pat. No. 3,428,785 issued Feb. 18, 1969, both by Stanley B. Welch and also assigned to the General Electric Company. Solid-state temperature control circuits operate with far greater accuracy and reliability than the traditional mechanical controls such as bimetallic switches and hydraulic bellows arrangements.

One form of the solid-state temperature control circuit for an electrical heating unit such as a domestic oven, comprises a threshold switching device which, when turned on, gates an SCR. The SCR is connected in series with a hot wire relay, and when gated energizes the relay. The energized relay closes a pair of contacts connected in series between an electrical heating element included in the oven and a power source. The oven temperature is sensed by a thermistor connected in a voltage divider which supplies a temperature-dependent voltage to the threshold switching device. When the oven temperature reaches a set point, the voltage applied to the switching device goes just below the threshold level so that the SCR is no longer gated, the relay is deenergized, and the relay contacts open. The set point is dependent upon the values of resistances connected in the voltage divider and the temperature coefficient of the thermistor.

The above-cited patent and applications disclose circuits which utilize a unijunction transistor as the threshold switching device. However, a silicon-controlled switch may also be conveniently utilized. The similarity in switching characteristics of a silicon-controlled switch to those of a unijunction transistor in a threshold circuit is described in Staisor, Application Note 90.16, Silicon-Controlled Switches (General Electric Company, Syracuse, New York, 1964).

A control circuit such as that described may be made so that it is very sensitive to changes in oven temperature. In such a situation, when the temperature is at the set point, rapid cycling due to instantaneous changes in oven temperature may result. In addition, when the voltage applied to the threshold switching device is just below the threshold level, inductive feedback from the oven power circuits to the temperature sensor circuit may cause erratic turn-on of switching element which results in relay chatter. Since rapid cycling of the relay and relay chatter tend to prematurely wear out the relay, it is desirable to provide means to eliminate these effects.

A solid-state temperature control circuit of the type described may be made operable to selectively maintain oven temperature at a first or second level, by providing means to change the resistance of the voltage divider in such a circuit. It is desirable to provide simplified switching means for changing the resistance connected in the voltage divider.

It is therefore an object of the present invention to provide a solid-state circuit for controlling the energization of a heating means in which erratic energization of the heating means is prevented.

It is a more specific object of the present invention to provide a control circuit of the type including a voltage divider in which simplified means are provided for connecting additional resistance in the voltage divider to change the set point of the circuit.

It is a further object of the present invention to provide a control circuit of the type described which is temperature compensated for obtaining repeatable results under varying ambient temperature conditions.

Briefly stated, in accordance with the present invention there is provided a solid-state control circuit including a threshold switching device which controls the actuation of a relay to connect an oven heating element to a source of power. A voltage divider including a thermistor provides a temperature-dependent voltage to the switching device. In one form of the invention, the set point of the control circuit, i.e., the temperature at which the conductive state of the threshold switching element is changed, is raised by connecting additional resistance in the voltage divider by means of a single switch. In another form of the invention, a hot wire relay is connected in the voltage divider and changes in resistance as it is energized or deenergized to shift the voltage applied to the threshold device above or below the threshold voltage respectively to prevent erratic closing of the relay contacts.

BRIEF DESCRIPTION OF THE DRAWINGS

The foregoing objects and features of novelty which characterize the invention are pointed out with particularity in the claims, forming the concluding portion of the specification. Various embodiments of the invention, its advantages and specific objects obtained with its use may be further understood by reference to the following description in conjunction with the following drawings.

Of the drawings.

DESCRIPTION OF THE PREFERRED EMBODIMENT

Figure 1:
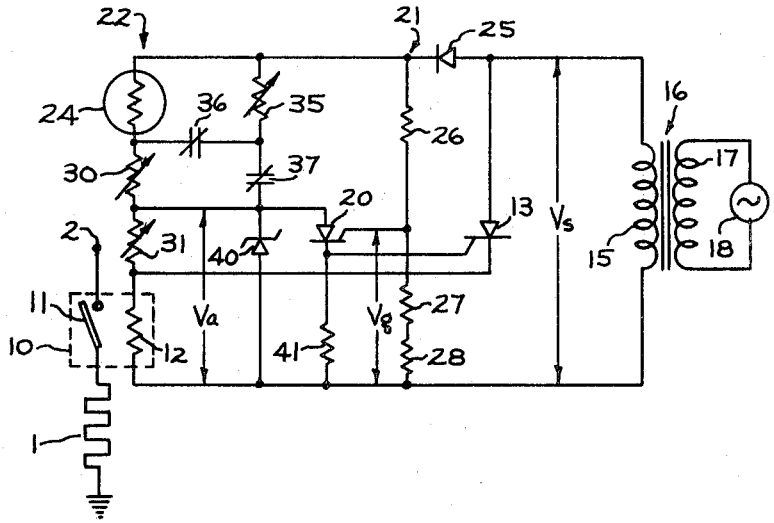
FIG. 1 is a schematic representation of a solid-state temperature control circuit constructed in accordance with the present invention.

FIG. 1 illustrates a temperature control circuit for a heating unit which may, for example, be a domestic electrical oven. The circuit maintains oven temperature at one of two selected levels by opening and closing the circuit between an electrical heating element 1 and a source 2. In order to utilize the control circuit in a gas oven, the heating element 1 could be replaced by a solenoid controlling the flow of gas.

In a manner described below, a temperature-varying voltage is applied to a silicon-controlled switch 20, and when the SCS 20 is turned on, it actuates a hot wire relay 10. The hot wire relay 10 includes a pair of contacts 11 which are connected in series between the heating element 1 and the source 2 and a heating resistor 12, which, when energized, thermally biases the contacts 11 closed. The improvement comprehended by the circuit of FIG. 1 lies in the novel manner in which cycling of the relay is prevented and in which relay chatter is eliminated. Since the circuitry by which the improvement is achieved is an integral part of the circuit, the entire circuit of FIG. 1 is analyzed prior to a fuller discussion of the means by which the relay is stabilized.

The heating resistor 12 is connected in series with an SCR 13, and is energized when the SCR 13 conducts. The resistor 12 and the SCR 13 are connected across a secondary winding 15 of a transformer 16. A source 18 is coupled to the secondary winding 15 by a primary winding 17. In domestic oven applications, the source 18 may supply 120 volts at 60 Hz. The gate of the SCR 13 is connected to the cathode of the silicon controlled switch, or SCS 20, and the SCR 13 is fired when the SCS 20 is turned on.

An SCS is a four-layer threshold switching device having an anode, cathode, anode gate, and cathode gate. It may be connected in various configurations for varying switching applications. In a circuit such as the present circuit, the cathode gate is not utilized. The anode gate is maintained at a potential which is positive with respect to that of the cathode, and a varying voltage is applied to the anode. When the anode voltage exceeds the threshold voltage, the SCS turns on and current flows from the anode to the cathode. The threshold voltage is equal to the anode gate potential plus a voltage increment which is characteristic of the SCS.

A constant anode gate voltage is provided by a voltage divider 21, and a temperature-varying voltage is supplied to the anode of the SCS from a voltage divider 22. The voltage dividers 21 and 22 are connected across the upper and lower ends of the secondary winding 15. A half-wave rectifying diode 25 is connected between the upper end of the winding 15 and the voltage dividers 21 and 22 to energize the control circuit during positive half cycles of source voltage. The voltage divider 21 comprises voltage dropping resistors 26 and 27 and a temperature compensating resistor 28 connected in series. The anode gate of the SCS 20 is coupled across the resistors 27 and 28 so that the anode gate voltage, $v_g$ may be expressed in terms of the secondary voltage, $v_s$, as $$v_g = v_s \frac{R_{27} + R_{28}}{R_{26} + R_{27} + R_{28}}.$$

In this equation, as in subsequent equations, the term R followed by a subscript denotes a resistor having the reference numeral corresponding to the subscript. As the ambient temperature is increased the firing point of the SCS 20 changes slightly. This change is in the direction to increase oven temperature. Resistor 28 is a positive temperature coefficient resistor. As the temperature increases, the bias on the gate is increased to compensate for shifting firing characteristic. Tests show oven cleaning temperatures shifting upward approximately 10° F. as the control is heated from 80° F. to 200° F.

The voltage divider 22 is arranged to provide for two modes of operation. The first may, for example, be a baking mode in which the temperature is to be maintained at a selected level within a range between about 150° F. and 550°F. A rheostat adjustment is provided so the exact baking temperature desired may be chosen. The second mode may be a self-cleaning mode in which a much higher temperature, for example 900°F., is maintained. The set point of the control circuit, i.e., the temperature at which the SCS 20 turns off, is determined by the resistances connected in the voltage divider.

A Zener diode 40 is connected across the SCS 20 to limit it the voltage applied thereto. A SCR gate bypass resistor 41 is connected in the cathode circuit of the SCS 20.

The voltage divider 22 comprises a thermistor 24, temperature setting rheostat 30, calibrating rheostat 31, and the heating resistor 12 connected in series. The upper end of the thermistor 24 is connected to the upper end of the winding 15, and the lower end of the heating resistor 12 is connected to the lower end of the winding 15.

A resistor 35 and contact pair 36 are connected in series across the thermistor 24, and a contact pair 37 is connected across the calibrating rheostat 30. The anode-cathode circuit of the SCS 20 is connected across the rheostat 31 and the heating resistor 12. The anode of the SCS 20 is connected to the upper end of the rheostat 31, and the cathode of the SCS 20 is coupled through the resistor 41 to the lower end of the heating resistor 12.

The contact pairs 36 and 37 may be ganged, and they provide a means by which manual selection of the mode in which the oven is to operate is made. In the bake mode, the contact pairs 36 and 37 are opened. Thus the expression for the anode voltage potential $v_a$, in terms of $v_s$ for the first mode of operation becomes $$v_a = v_s \frac{R_{12} + R_{31}}{R_{24} + R_{30} + R_{12} + R_{31}}.$$

In the self-cleaning mode, the contact pairs 36 and 37 are closed, and $$v_a = v_s \frac{(R_{24} + R_{35})(R_{31} + R_{12})}{(R_{24} + R_{35})(R_{12} + R_{31}) + R_{24} + R_{35}}.$$

The temperature sensing precedes in a conventional manner. The thermistor 24 is chosen to have a positive temperature coefficient, and the rheostats 30 and 35 are adjusted to provide the desired set points for each mode of operation. When the circuit is initially energized, the thermistor 24 is cool. The denominator of the expressions for $v_a$ in each mode of operation is at its minimum so that the highest possible $v_a$ is applied to the anode of the SCS 20. The values of the resistors in the voltage divider 22 are chosen so that this $V_a$ exceeds the threshold voltage, which is approximately $v_g$. The SCS 20 is turned on to gate the SCR 13 and connect the voltage $v_s$ across the heating resistor 12. The SCS 20 and the SCR 13 continue to conduct the remainder of the positive half cycle of $v_s$, and on the next positive half cycle this operation is repeated.

After a number of half cycles, the heating resistor 12 heats sufficiently to bias the contacts 11 of the hot wire relay 10 closed to energize the heating element 1. The oven heats, and thermally biases the thermistor 24. As the temperature of the heating element 1 increases, the resistance of the thermistor 24 increases, and consequently $v_1$ continues to decrease until the temperature sensed by the thermistor 24 reaches the set point. $V_a$ is no longer sufficient to turn on the SCS 20, and the SCR 13 is no longer gated. The heating resistor 12 cools, and the contacts 11 of the hot wire relay 10 open. The oven cools until $v_a$ again exceeds the threshold voltage. The oven temperature is cycled about the set point in this manner. However, if $v_a$ were responsive only to the instantaneous oven temperature as sensed by the thermistor 24, rapid cycling, which would cause a premature failure of the hot wire relay 10, would inevitably result.

Rapid cycling is prevented by using the heating resistor 12 to vary $v_a$ when the oven temperature is within a small range of the set point. The amplitude of this range is determined by the choice of the change in resistance with respect to temperature of the heating resistor 12.

In examining the expression for $v_a$, it is seen that the changes in the resistance of the heating resistor 12 have a larger effect on the numerator of the expression for $v_a$ than on the denominator. When $v_a$ is above the threshold voltage, the heating resistor 12 is energized so that it heats and its resistance increases. When $v_a$ decreases below the threshold voltage, after the temperature rises above the set point, the SCS 20 turns off. The SCr 13 is not gated during succeeding half cycles, and the heating resistor 12 quickly cools. Its resistance decreases and $v_a$ is further decreased. To turn the SCS 20 on once again, the oven temperature must fall sufficiently so that the increase in $v_a$ due to the change in the resistance of the thermistor 24 overcomes the decrease due to the cooling of the heating resistor 12.

After the heating resistor 12 is fully cooled or fully heated, its resistance no longer changes, and $v_a$ varies solely in response to changes in the resistance of the thermistor 24. The control circuit responds to changes in oven temperature as rapidly as possible when oven temperature is not within a small range of the set point. Also, relay chatter is positively eliminated even though various possible sources of relay chatter are present. The decrease in $v_a$ due to the cooling of the heat resistor 12 is chosen to be such that small signals coupled by inductive feedback in the oven power circuits to the SCS 20 are not sufficient to increase $v_a$ to the threshold voltage when it is desired to turn the SCS 20 off.

It is noted that the following arrangement is necessary to switch from the baking mode to the self-cleaning mode of operation in the circuit of FIG. 1. In the baking mode, the thermistor 24 is connected in series with a first rheostat 30 to provide a first set point. In order to operate the control circuit in the self-cleaning mode of operation, a first contact pair 37 must be used to short circuit the rheostat 30 and a second contact pair 36 is needed to connect the rheostat 35 across the thermistor 24. This arrangement is necessary in order to decrease the initial value in the numerator in the expression for $v_1$ in order to provide a higher set point.

Figure 2:
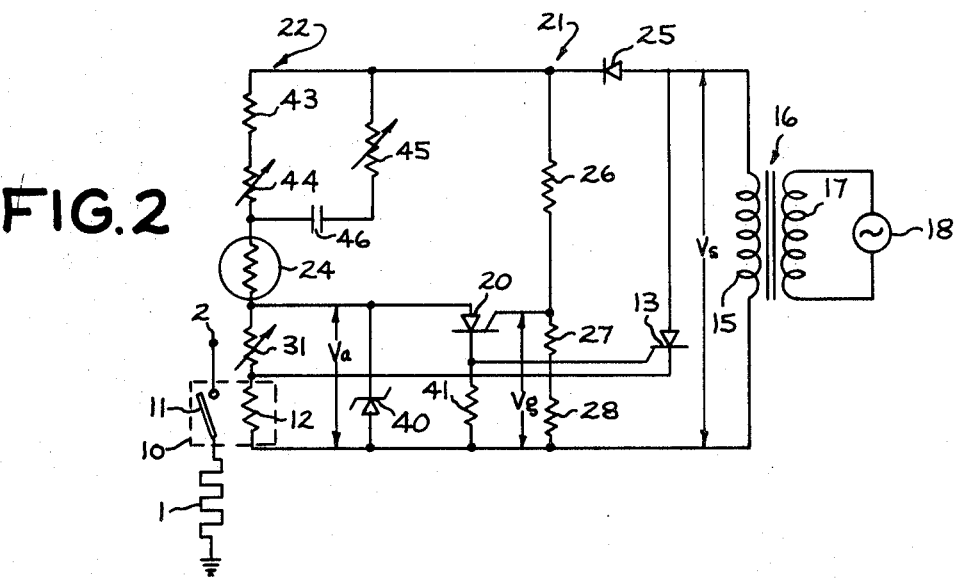
FIG. 2 is a schematic representation of an embodiment of the present invention including an improved arrangement for changing the set point of the circuit.

FIG. 2 illustrates a switching circuit not only including the advantageous antichatter arrangement of FIG. 1 but also including a simplified switching arrangement. The circuit of FIG. 2 differs from the circuit of FIG. 1 only in the arrangement of the voltage divider 22. Accordingly, the same reference numerals are used to denote corresponding elements. In the baking mode, a resistor 43 and a rheostat 44 are connected in series with the thermistor 24, rheostat 31 and heating resistor 12 in the voltage divider 22. A rheostat 45 and contact pair 46 are connected in series across the resistors 43 and 44, and the contact pair 46 is closed for self-cleaning mode operation. This arrangement provides the requisites for desired operation in a simplified manner. This arrangement is particularly advantageous in a control circuit providing two temperature set points. The mere shorting out of a resistance in series with the thermistor 24, an arrangement which would also require only one switch, is not sufficient to provide optimal operation.

In the circuit of FIG. 2, the rheostat 44 may be set to provide a desired first set point. In order to initiate the second mode of operation, the resistors 43 and 44 are not merely shorted out of the circuit. Instead, a rheostat 45 is connected across them by means of a single switch. The resistance of the rheostat 45 may be set to provide the desired second set point. A fixed resistor may be used in its place. The values of the circuit components may be chosen so that changes in setting of the rheostat 44 will not appreciably affect the level of the second set point. The setting of neither of the rheostats 44 or 45 need be disturbed to switch from one mode of operation to the next.

Figure 3:
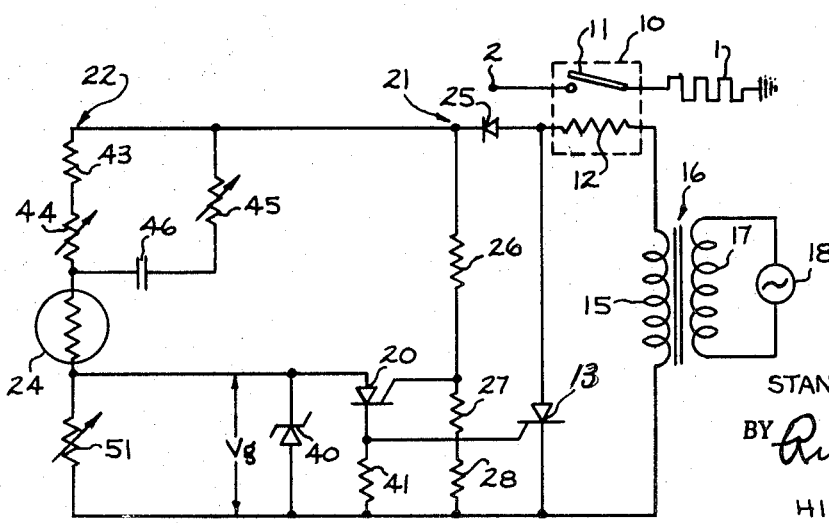
FIG. 3 is a schematic representation of another embodiment of the present invention including a relay connected in a conventional manner.

As seen in FIG. 3, the improved switching arrangement of FIG. 2 is also advantageous in a circuit in which the hot wire relay 10 is connected in a conventional manner rather than in the voltage divider 22 of the circuits of FIGS. 1 and 2. The hot wire relay 10 is again connected in series with the SCR 13 and is also connected between the diode 25 and the upper end of the secondary winding 15. A rheostat 51 is connected in the voltage divider 22 in place of the heating resistor 12 and calibrating potentiometer 31. This circuit operates as does the circuits of FIG. 2. However, the numerator of the expression for $v_a$ remains constant during each mode of operation.

It is thus seen that the present invention provides an improved temperature control circuit operated at more than one set point. First, relay chatter is eliminated while circuit sensitivity is maintained. In addition, a simplified arrangement is provided to switch from one mode of operation to the other.

I claim:

1. A temperature control circuit for controlling the opening and closing of a pair of relay contacts connected in series between an electrical heating element and a power source, said control circuit being adapted to be connected to a voltage source and comprising in combination:
   a. a heating resistor for thermally biasing the contacts of said relay toward a closed position when said heating resistor is energized;
   b. a controlled switching element connected in series with said heating resistor and capable of assuming a conductive state during which said heating resistor is energized or a nonconducting state during which said heating resistor is deenergized;
   c. a threshold switching element coupled to said controlled switching element for controlling the state of said controlled switching element; and
   d. a voltage divider circuit for providing a temperature-dependent voltage to said threshold switching element and including a first resistance for a first mode of operation, a thermistor, and said heating resistor connected in series, the resistance of said heating resistor changing upon energization or deenergization to change the voltage applied to the threshold switching device by said voltage divider in the same direction as the change produced by said thermistor as oven temperature is increasing or decreasing.

2. A temperature control circuit according to claim 1 further comprising:
   a. a contact pair and a second resistance connected in series across said first resistance for operating said circuit in a second mode of operation when said contact pair is closed.

3. A temperature control circuit according to claim 1 in which said thermistor is of the positive temperature coefficient type.

4. The arrangement according to claim 2 in said threshold switching device is a silicon controlled switch.

5. A temperature control circuit for controlling the energization of a circuit comprising a power source, a pair of relay contacts and electrical heating elements, comprising in combination:
   a. actuation means for controlling the opening and closing of said relay contacts;
   b. a controlled switching element connected in series with said actuating means and capable of assuming a conductive state for energizing said actuating means and a nonconducting state during which said actuating means are not energized;
   c. a threshold switching element coupled to said controlled switching element for controlling the conduction of said controlled switching element and having conductive and nonconductive states;
   d. a voltage divider comprising a first resistive portion and a thermistor for applying a temperature-dependent voltage to said threshold switching element to provide a first mode of operation; and
   e. a contact pair and a second resistive portion connected in series across the resistance portion of said voltage divider, said contact pair being closeable to provide a second mode of operation.

6. A temperature control circuit according to claim 5 further comprising:
   a. a second voltage divider comprising voltage dropping resistor means and a temperature compensating resistor connected in series and operating in conjunction with the threshold switching device to compensate for changes in ambient temperature of the control.